US012762431B2

(12) United States Patent
Masui

(10) Patent No.: US 12,762,431 B2
(45) Date of Patent: Oct. 13, 2026

(54) INTEGRATING SCHEDULED FUTURE EVENTS INTO TRAINING OF TIME SERIES FORECASTING MODEL

(71) Applicant: Sage Global Services Limited, Newcastle-Upon-Tyne (GB)

(72) Inventor: Tomonori Masui, San Diego, CA (US)

(73) Assignee: Sage Global Services Limited, Newcastle-Upon-Tyne (GB)

( * ) Notice: Subject to any disclaimer, the term of this patent is extended or adjusted under 35 U.S.C. 154(b) by 628 days.

(21) Appl. No.: 18/137,902

(22) Filed: Apr. 21, 2023

(65) Prior Publication Data

US 2024/0354597 A1 Oct. 24, 2024

(51) Int. Cl.
*G06N 5/022* (2023.01)

(52) U.S. Cl.
CPC .................................... *G06N 5/022* (2013.01)

(58) Field of Classification Search
None
See application file for complete search history.

(56) References Cited

U.S. PATENT DOCUMENTS 8,577,706 B1 * 11/2013 Aykin .............. G06Q 10/06311 705/7.14
2022/0180266 A1 6/2022 Guiffre et al.

OTHER PUBLICATIONS

Bejarano-Luque JL, Toril M, Fernandez-Navarro M, Gijon C, Luna-Ramirez S. A deep-learning model for estimating the impact of social events on traffic demand on a cell basis. IEEE Access. May 6, 2021;9:71673-86. (Year: 2021).*
Zhang W, Jha DK, Laftchiev E, Nikovski D. Multi-label prediction in time series data using deep neural networks. arXiv preprint arXiv:2001.10098. Jan. 27, 2020. (Year: 2020).*
Jang, Hung-Chin et al., "Traffic Flow Forecast for Traffic with Forecastable Sporadic Events", 2019 Twelfth International Conference on Ubi-Media Computing (Ubi-Media), IEEE, Aug. 5, 2019, pp. 145-150.
Canli, H. et al., "Design and Implementation of a Prediction Approach Using Big Data and Deep Learning Techniques for Parking Occupancy", Arabian Journal for Science and Engineering, vol. 47, No. 2, Sep. 4, 2021, pp. 1955-1970.
Masui, Tomonori, "Building a time series forecasting model to predict future annual leave", Jan. 11, 2023, pp. 1-9.
Geisser, Seymour, "Predictive Inference: an Introduction", Jun. 30, 1993, Chapter 1, pp. 1-18.

* cited by examiner

*Primary Examiner* — Clifford Hilaire
(74) *Attorney, Agent, or Firm* — Raubvogel Law Office

(57) ABSTRACT

In various embodiments, a time series forecasting model can take into account scheduled (or high-confidence) future events into training of a time series forecasting model. During model training, such future event data can be integrated with data describing past events, so as to improve the accuracy of the model in generating forecasts. By taking into account such scheduled (or high-confidence) future events, forecasting of unscheduled future events may be improved.

21 Claims, 12 Drawing Sheets

INTEGRATING SCHEDULED FUTURE EVENTS INTO TRAINING OF TIME SERIES FORECASTING MODEL

TECHNICAL FIELD

The present document relates to systems and methods for automatically forecasting a time series representing future events.

BACKGROUND

Time series forecasting is a process wherein time series data may be analyzed using various techniques such as statistics, modeling, and/or machine learning, so as to generate forecasts (or predictions) about future events and/or trends. It can be an important function in many contexts, such as for example in operating financial and human resources (HR) departments or businesses. In general, time series forecasting is performed using information about past events as input.

In many situations, however, certain highly-likely future events are known in advance. For example, in businesses where people make reservations or buy tickets in advance, future demand may be relatively well-known. For example, in an airline business, many customers book their flights a few months prior to travel, thus allowing predictions about passenger load to be made in advance. In cash flow forecasting systems, there may be user-foreseen future cash inflows and outflows. Similarly, other contexts exist in which highly-likely future events may be known in advance.

SUMMARY

In various embodiments, a time series forecasting model can take into account scheduled (or high-confidence) future events into training of a time series forecasting model. In at least one embodiment, during model training, such data describing scheduled future events may be integrated with data describing past events, so as to improve the accuracy of the model in generating forecasts.

By taking into account such scheduled (or high-confidence) future events, the techniques described herein may provide improved forecasting of unscheduled future events, as well as demand, yield, capacity, load, staffing, and/or the like. Forecasts may be aggregated at any desired level or group of individuals, including for example, a team, department, organization, company, and/or the like.

By integrating scheduled (or high-confidence) future events into a forecasting model and taking event booking patterns into consideration, the described system can make forecasts more accurately.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

Figure 1:
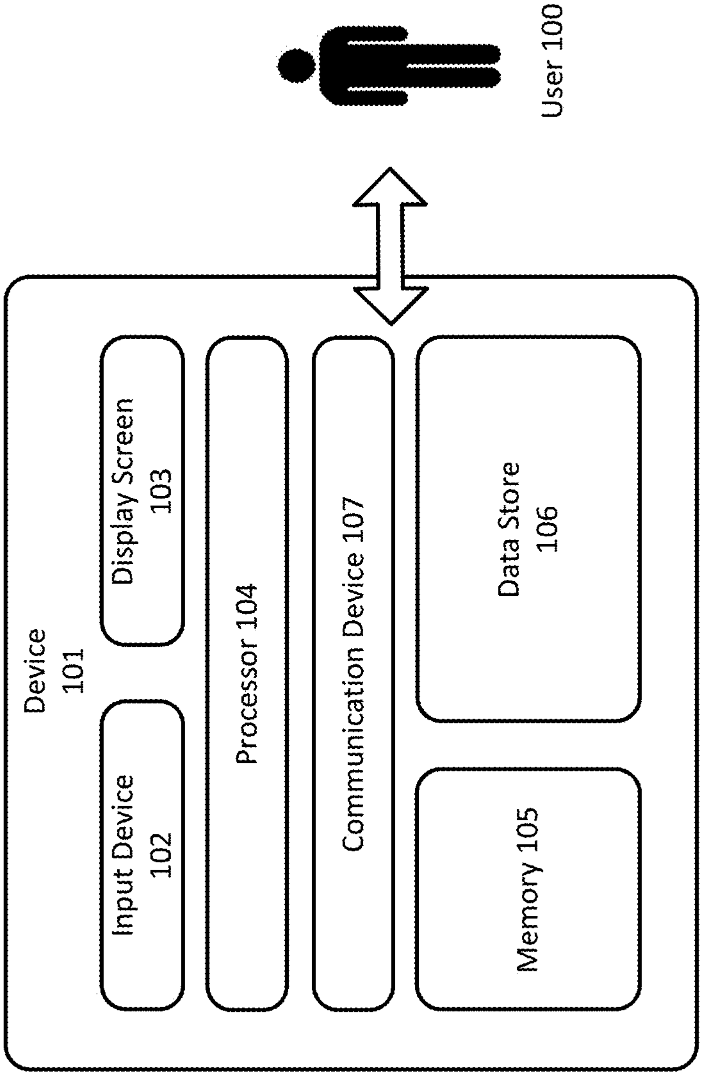
FIG. 1 is a block diagram depicting a hardware architecture for implementing the techniques described herein according to one embodiment.

In various embodiments, as described in more detail herein, a time series forecasting system may integrate scheduled future event data with historical event data, so as to improve accuracy of forecasts for unscheduled future events.

In some embodiments, one or more components, as shown and described below in connection with FIGS. 1 and 2, may be used to implement the system and method described herein. In at least one embodiment, such components may be implemented in a cloud computing-based client/server architecture, using, for example, Amazon Web Services, an on-demand cloud computing platform available from Amazon.com, Inc. of Seattle, Washington. Therefore, for illustrative purposes, the system and method are described herein in the context of such an architecture. One skilled in the art will recognize, however, that the systems and methods described herein may be implemented using other architectures, such as for example a standalone computing device rather than a client/server architecture.

Further, the functions and/or method steps set forth herein may be carried out by software running on one or more of the device 101, client device(s) 108, server(s) 110, and/or other components. This software may optionally be multi-function software that may be used to retrieve, store, manipulate, and/or otherwise use data stored in data storage devices such as data store 106, and/or to carry out one or more other functions.

For illustrative purposes, the system is described in the context of forecasting unscheduled future leaves of absence for employees of a company, based on historical trends and further based on scheduled future leaves of absence. However, one skilled in the art will recognize that the described techniques can be used for forecasting other types of unscheduled future events. For example, the described techniques can be used for forecasting expected load or demand for items such as airline tickets, tickets for concerts or sporting events, restaurant reservations, and/or appointments for hair stylists, doctors, therapists, and/or the like.

Another example of an application of the described techniques is to forecast cash flow based on historical trends and further based on high-confidence future income and/or expenditures.

Definitions and Concepts

For clarity, the description presented herein may refer to mechanisms for predicting/forecasting unscheduled future events; however, the techniques described herein can be applied in various other contexts as well, and are not limited to making forecasts as to unscheduled future events. Rather the system can be applied to generate forecasts as to demand, yield, capacity, load, staffing, and/or the like. Thus, references to predicting or forecasting unscheduled future events, or simply "events", are understood to apply to any type of forecasts or predictions that can be made in accordance with the techniques described herein. Examples include, without limitation, airline tickets, concert tickets, demand for services or appointments for hair stylists, doctors, restaurants, and/or the like.

For purposes of the description herein, a "user", such as user 100 referenced herein, may be an individual, enterprise, or other group, which may optionally include one or more users. A "data store", such as data store 106 referenced herein, may be any device capable of digital data storage, including any known hardware for nonvolatile and/or volatile data storage. A collection of data stores 106 may form a "data storage system" that can be accessed by multiple users. A "computing device", such as device 101 and/or client device(s) 108, may be any device capable of digital data processing. A "server", such as server 110, may be a computing device that provides data storage, either via a local data store, or via connection to a remote data store. A "client device", such as client device 108, may be an electronic device that communicates with a server, provides output to a user, and accepts input from a user.

An "entity" may be a stakeholder, customer, company, association, organization, and/or the like, or an agent for any of these.

An "event" may be any occurrence, expected occurrence, instance of demand or supply, appointment, encounter, meeting, entertainment event, sports event, purchase of a good or service, delivery, resource consumption or provision, and/or the like. An event may be associated with a particular moment in time, or a time period (duration) of any length, or it may not be associated with any particular time period or moment. An event may be associated with one or more specific place(s), or it may not be associated with any specific place. One example of an event is an employee leave of absence.

A "scheduled event" (or "scheduled future event") may be an event that has been booked or scheduled for some time in the future, or an event that is known will take place in the future with some relatively high degree of confidence. Thus, the time when the event is scheduled may thus be in advance of the time of the event itself (the "event occurrence time" or "event time"); the length of time between the time when the event is scheduled and the event occurrence time may be any length, from moments to weeks to months or even more. The term "scheduled event" is used herein to apply to any future event that is known will take place in the future with some relatively high degree of confidence (i.e., a "high-confidence future event"), and is therefore not intended to be limited to events that are explicitly scheduled by a user or other entity.

An "unscheduled event" (or "unscheduled future event") may be an event that takes place at some time but is not known in advance. In at least one embodiment, the techniques described herein provide mechanisms for forecasting, or predicting, unscheduled events based on patterns of past events in combination with scheduled future events.

A "past event" (or "historical event") may be an event that has occurred in the past (i.e., the event occurrence time is in the past).

A "model" may be a predictive model, including a machine learning model or any other type of model that can be implemented in hardware, software, and/or any combination therefore. The model may be a predictive model which may be trained using training data as described herein. Training mechanisms may use techniques that are known in the art. Once trained, the model may be used for generating forecasts (predictions) as to unscheduled future events, as described in more detail herein.

System Architecture

According to various embodiments, the systems and methods described herein may be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the systems and methods described herein may be designated as client devices, which may be generally operated by end users. Other devices may be designated as servers, which generally conduct back-end operations and communicate with client devices (and/or with other servers) via a communications network such as the Internet. In at least one embodiment, the techniques described herein may be implemented in a cloud computing environment using techniques that are known to those of skill in the art.

In addition, one skilled in the art will recognize that the techniques described herein may be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1, there is shown a block diagram depicting a hardware architecture that may be used for practicing the described system, according to one embodiment. Such an architecture may be used, for example, for implementing the techniques of the system in a computer or other device 101. Device 101 may be any electronic device.

In at least one embodiment, device 101 may include a number of hardware components that are well known to those skilled in the art. Input device 102 may be any element that receives input from user 100, including, for example, a keyboard, mouse, stylus, touch-sensitive screen (touchscreen), touchpad, trackball, accelerometer, microphone, or the like. Input may be provided via any suitable mode, including for example, one or more of: pointing, tapping, typing, dragging, and/or speech. In at least one embodiment, input device 102 may be omitted or functionally combined with one or more other components.

Data store 106 may be any magnetic, optical, or electronic storage device for data in digital form; examples include read-only memories (ROMs), random access memories (RAMs), flash memory, magnetic or solid state drives, or the like. In at least one embodiment, data store 106 may store information that may be utilized and/or displayed according to the techniques described below. Data store 106 may be implemented in a database or using any other suitable arrangement. In another embodiment, data store 106 may be stored elsewhere, and data from data store 106 may be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store event data, appointment data, forecasts, predictions, historical data, and/or the like. In at least one embodiment, such data may be stored at another location, remote from device 101, and device 101 may access such data over a network, via any suitable communications protocol.

In at least one embodiment, data store 106 may be organized in a file system, using well known storage architectures and data structures, such as relational databases. Examples include MySQL and PostgreSQL. Appropriate indexing may be provided to associate data elements in data store 106 with each other. In at least one embodiment, data store 106 may be implemented using cloud-based storage architectures such as Amazon S3 and/or Cloudflare.

Data store 106 may be local or remote with respect to the other components of device 101. In at least one embodiment, device 101 may be configured to retrieve data from a remote data storage device when needed. Such communication between device 101 and other components may take place wirelessly, by Ethernet connection, via a computing network such as the Internet, via a cellular network, or by any other appropriate communication systems.

In at least one embodiment, data store 106 may be detachable in the form of a CD-ROM, DVD, flash drive, USB hard drive, and/or the like. Data store 106 may include multiple stores for redundancy, backup, sharding, and/or scalability. Information may be entered from a source outside of device 101 into a data store 106 that may be detachable, and later displayed after the data store 106 is connected to device 101. In another embodiment, data store 106 may be fixed within device 101.

In at least one embodiment, data store 106 may be organized into one or more well-ordered data sets, with one or more data entries in each set. Data store 106, however, may have any suitable structure. Accordingly, the particular organization of data store 106 need not resemble the form in which information from data store 106 is displayed to user 100 on display screen 103. In at least one embodiment, an identifying label may also be stored along with each data entry, to be displayed along with each data entry.

Display screen 103 may be any element that displays information such as text and/or graphical elements. In particular, display screen 103 may present a user interface for entering, viewing, configuring, selecting, editing, and/or otherwise interacting with events and/or forecasts as described herein. In at least one embodiment where only some of the desired output may be presented at a time, a dynamic control, such as a scrolling mechanism, may be available via input device 102 to change which information is currently displayed, and/or to alter the manner in which the information is displayed.

Processor 104 may be a conventional microprocessor for performing operations on data under the direction of software, according to well-known techniques. Memory 105 may be random-access memory having a structure and architecture as are known in the art, for use by processor 104 in the course of running software.

A communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any applicable standards such as, for example, IEEE 802.11. Communication device 107 may be capable of transmitting and/or receiving signals to transfer data and/or initiate various processes within and/or outside device 101.

Figure 2:
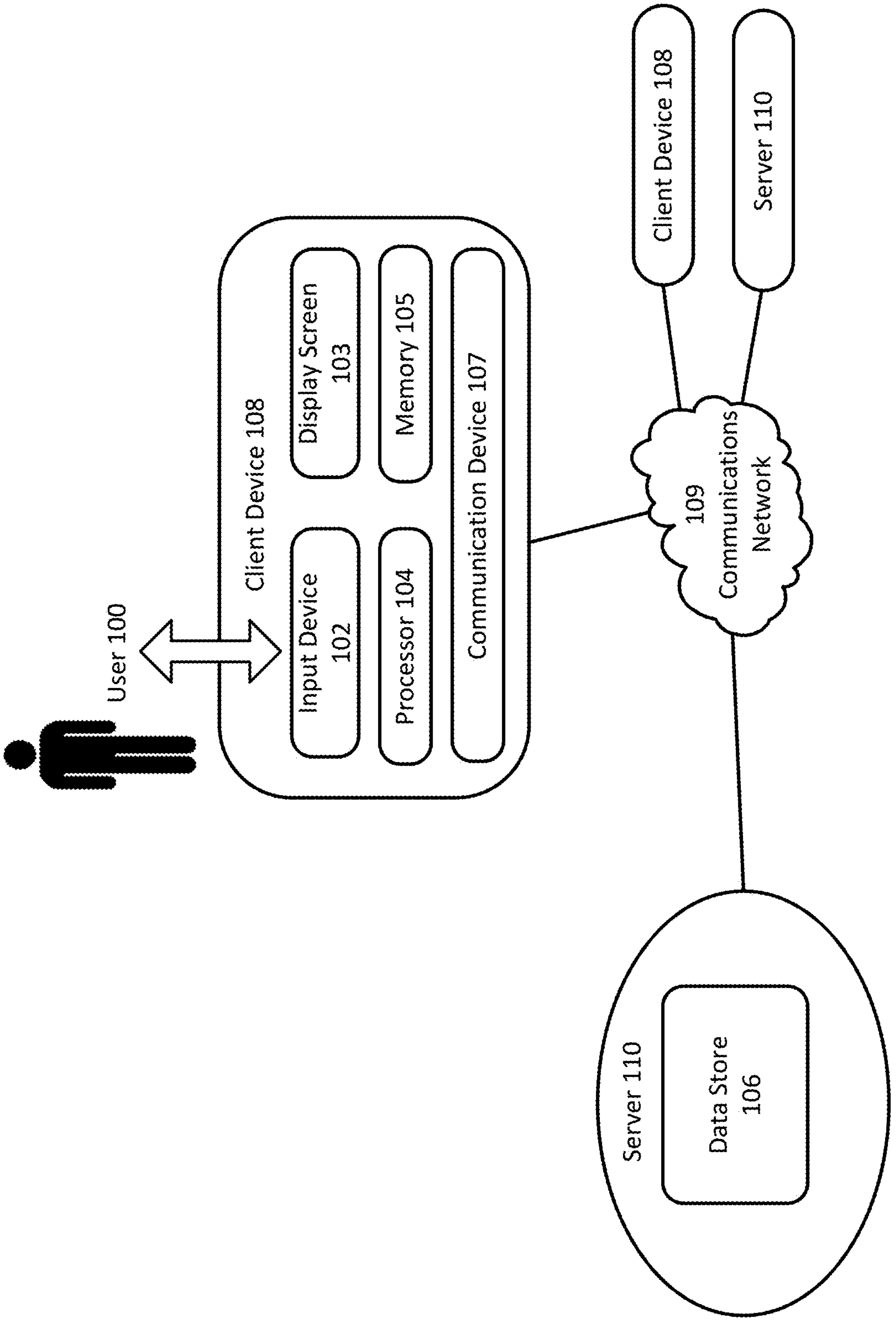
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing may be done completely independently from user input/output. An example of such a client/server environment may be a web-based implementation, wherein client device 108 runs a browser that provides a user interface for interacting with web pages and/or other web-based resources from server 110. Items from data store 106 may be presented as part of such web pages and/or other web-based resources, using known protocols and languages such as Hypertext Markup Language (HTML), Cascading Style Sheets (CSS), JavaScript, WebAssembly (Wasm), and/or the like.

Client device 108 may be any electronic device incorporating input device 102 and/or display screen 103, such as a desktop computer, laptop computer, cellular telephone, smartphone, handheld computer, tablet computer, kiosk, connected television, game system, wearable device, or the like. Any suitable type of communications network 109, such as the Internet, may be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol Secure (HTTPS), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 may be responsible for data storage and processing, and may incorporate data store 106. Server 110 may include additional components as needed for retrieving data from data store 106 in response to requests from client device 108.

As described above in connection with FIG. 1, data store 106 may be organized into one or more well-ordered data sets, with one or more data entries in each set. Data store 106, however, may have any suitable structure, and may store data according to any organization system known in the information storage arts, such as databases and other suitable data storage structures. As in FIG. 1, data store 106 may store event data, appointment data, forecasts, predictions, historical data, and/or the like; alternatively, such data may be stored elsewhere (such as at another server) and retrieved as needed.

In addition to or in the alternative to the foregoing, data may also be stored in a data store 106 that may be part of client device 108. In some embodiments, such data may include elements distributed between server 110 and client device 108 and/or other computing devices in order to facilitate secure and/or effective communication between such devices.

As discussed above in connection with FIG. 1, display screen 103 may be any element that displays information such as text and/or graphical elements. Various user interface elements, dynamic controls, and/or the like may be used in connection with display screen 103.

As discussed above in connection with FIG. 1, processor 104 may be a conventional microprocessor for use in an electronic device to perform operations on data under the direction of software, according to well-known techniques. Memory 105 may be random-access memory, having a structure and architecture as are known in the art, for use by processor 104 in the course of running software. A communication device 107 may communicate with other computing devices through the use of any known wired and/or wireless protocol(s), as discussed above in connection with FIG. 1.

In one embodiment, some or all of the system may be implemented as software written in any suitable computer programming language, whether in a standalone or client/server architecture. Alternatively, some or all of the system may be implemented and/or embedded in hardware.

Notably, multiple client devices 108 and/or multiple servers 110 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown).

In at least one embodiment, some or all components of the system may be implemented in software written in any suitable computer programming language, whether in a standalone or client/server architecture. Alternatively, some or all components may be implemented and/or embedded in hardware.

In at least one embodiment, the system may run a predictive model that may be trained and then used to forecast future events. As discussed in further detail below, the model may be trained using a combination of past events and scheduled future events, so as to improved predictive accuracy. In at least one embodiment, the model may run on any suitable hardware architecture, including for example that shown in FIG. 1 or 2.

Overview

In at least one embodiment, the techniques described herein can be used in connection with known time series forecasting models which may include well known statistical models such as autoregressive integrated moving average (ARIMA) models and/or advanced deep learning models such as a Temporal Fusion Transformer (TFT). Conventionally, such models only use past event data to generate a forecast. The techniques described herein provide mechanisms for improving the accuracy of forecasts by taking into account scheduled future events (along with past events) in generating forecasts regarding unscheduled future events. More specifically, the described system and method may incorporate such scheduled future events (along with past events) in the training of a time series forecasting model.

Figure 11:
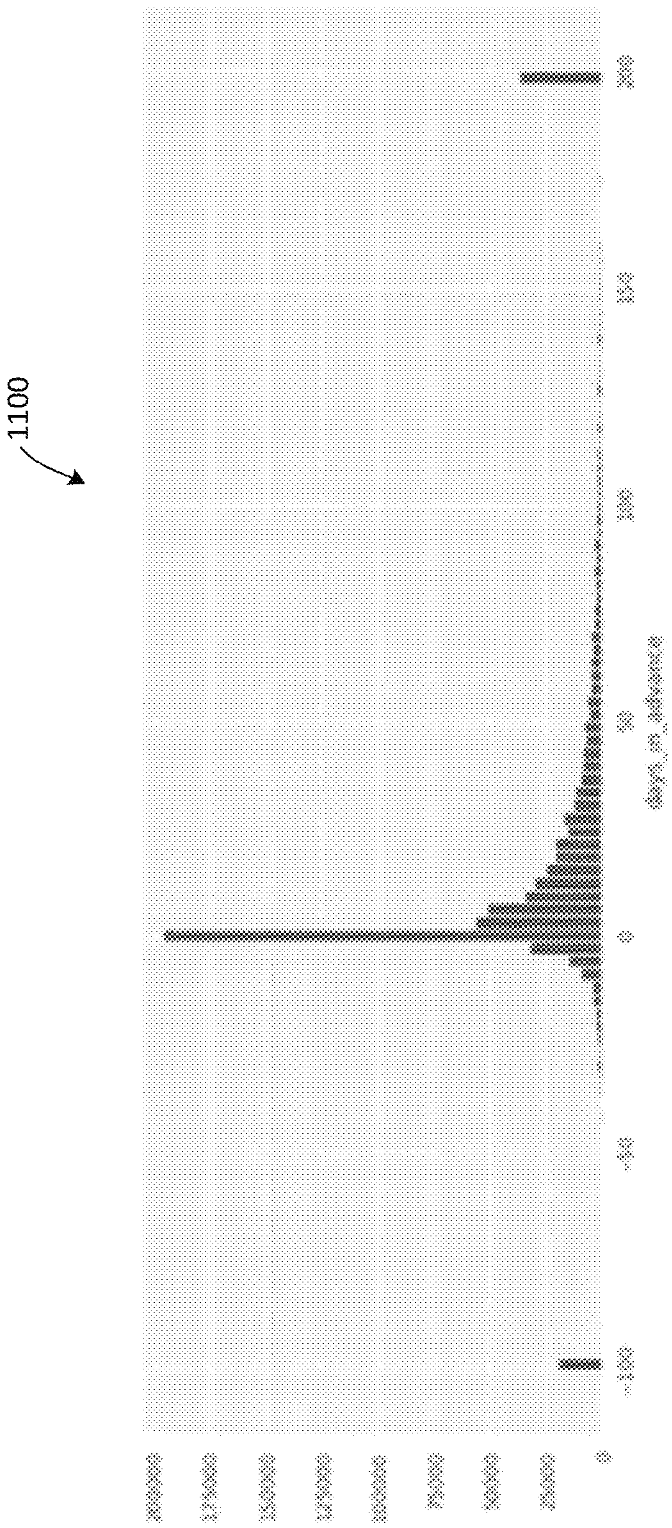
FIG. 11 is a graph depicting an example of a distribution of the number of days in advance for scheduling leaves of absence.

Referring now to FIG. 11, there is shown a graph 1100 depicting an example of a distribution of the number of days in advance for scheduling leaves of absence. In at least one embodiment, the techniques described herein are able to forecast unscheduled future events, taking into account not only past events but also future events that have been scheduled in the past.

Software Architecture

Figure 3:
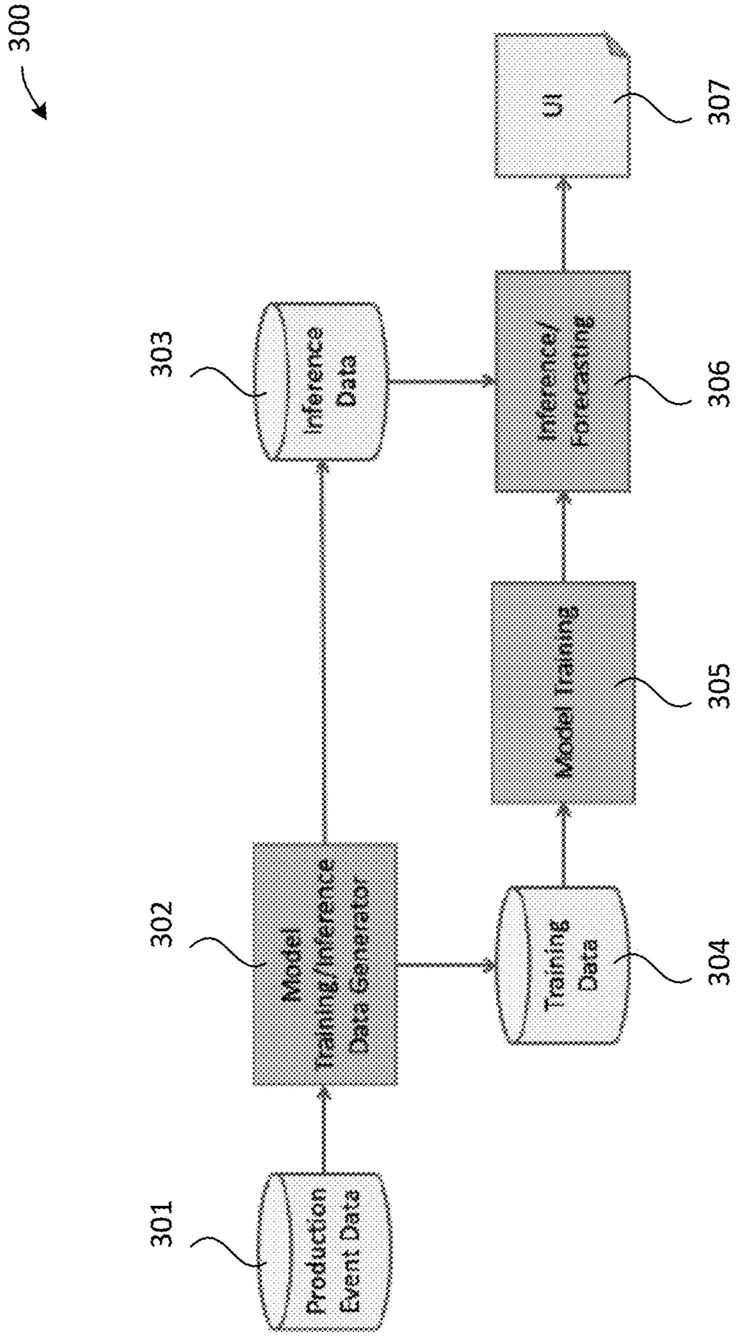
FIG. 3 is a block diagram depicting a software architecture for implementing the techniques described herein according to one embodiment.

Referring now to FIG. 3, there is shown a block diagram depicting a software architecture 300 for implementing the techniques described herein according to one embodiment. Software architecture 300 may be implemented on any suitable hardware architecture, including, for example, those shown in FIGS. 1 and/or 2. The various elements depicted in FIG. 3 may be implemented on various hardware components and may be distributed in any suitable fashion among those components; such components may include, for example, client device(s) 108, server(s) 110, memory 105, data store(s) 106, processor(s) 104, input device(s) 102, display screen(s) 103, and/or the like, as may be depicted in FIGS. 1 and/or 2. One skilled in the art will recognize that software architecture 300 may alternatively be implemented on other hardware architectures and/or configurations, without limitation.

Model training/inference data generator 302 may extract data from stored production event data 301. Using the extracted data, model training/inference data generator 302 may generate inference data 303. Inference data 303 may include past event data and scheduled future event data, and may take the form of one or more feature matrix 401, as described in more detail below.

Model training/inference data generator 302 may also generate model targets that may be stored as training data 304. Training data 304 may include multiple feature matrices 401 and targets across a training period. Notably, training data 304 may include any number of feature matrices 401 corresponding to different historical periods, whereas inference data 303 generally only includes one feature matrix 401 to predict the future.

Model training component 305 may then extract and use training data 304 to train the model generated by model training/inference data generator 302. Training may be performed using any known techniques for training a predictive model, as may be known in the art.

Inference/forecasting module 306 may then use the trained model (received from model training component 305), together with inference data 303, to generate forecasts. Such forecasts (also referred to as predictions) may then be output, for example via user interface 307, which may be presented on display screen(s) 103 or via any other output device.

In various embodiments, production event data 301, inference data 303, and/or training data 304 may be stored in any data store(s) 106 or in any other suitable location, either separately or in any combination.

Model Structure

Figure 4:
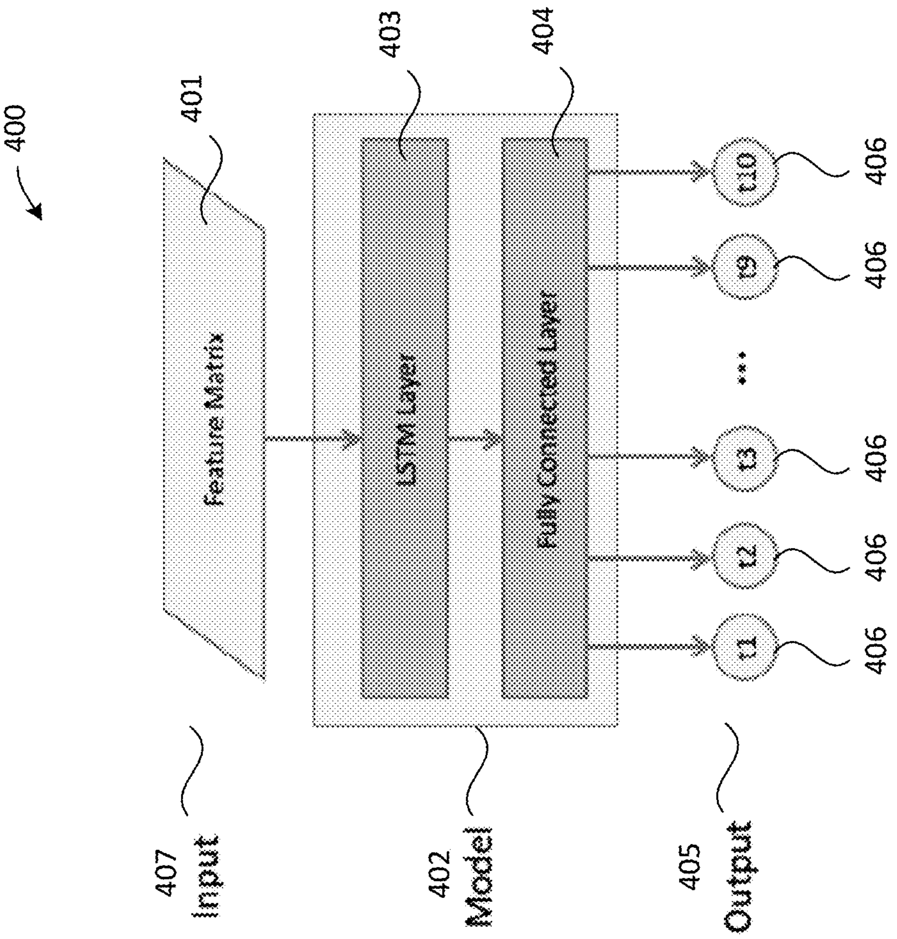
FIG. 4 is a block diagram depicting an example of a model structure for implementing the techniques described herein, according to one embodiment.

Referring now to FIG. 4, there is shown a block diagram depicting an example of a model structure 400 for implementing the techniques described herein, according to one embodiment. In at least one embodiment, time series forecasting model 402 may be any type of predictive model, such as a multi-label deep learning regression model and/or any other machine learning model. A two-dimensional feature matrix 401 (described in more detail below) may be directly supplied to model 402; model 402 may then forecast target events (such as unscheduled future events) based on information from feature matrix 401. As described in more detail herein, by using feature matrix 401, model 402 can learn from patterns associated with past (historical) events as well as patterns associated with scheduled future events. In this manner, the system is able to provide greater accuracy in forecasting future events before they are scheduled, such as for example leaves of absence for employees.

In at least one embodiment, model 402 may include a Long Short-Term Memory (LSTM) layer 403 that may be capable of learning long-term dependencies among time steps in a time series. In at least one embodiment, model 402 may also include fully connected layer 404 that receives information from LSTM layer 403 and generates output 405 including predicted future events 406.

Figure 10:
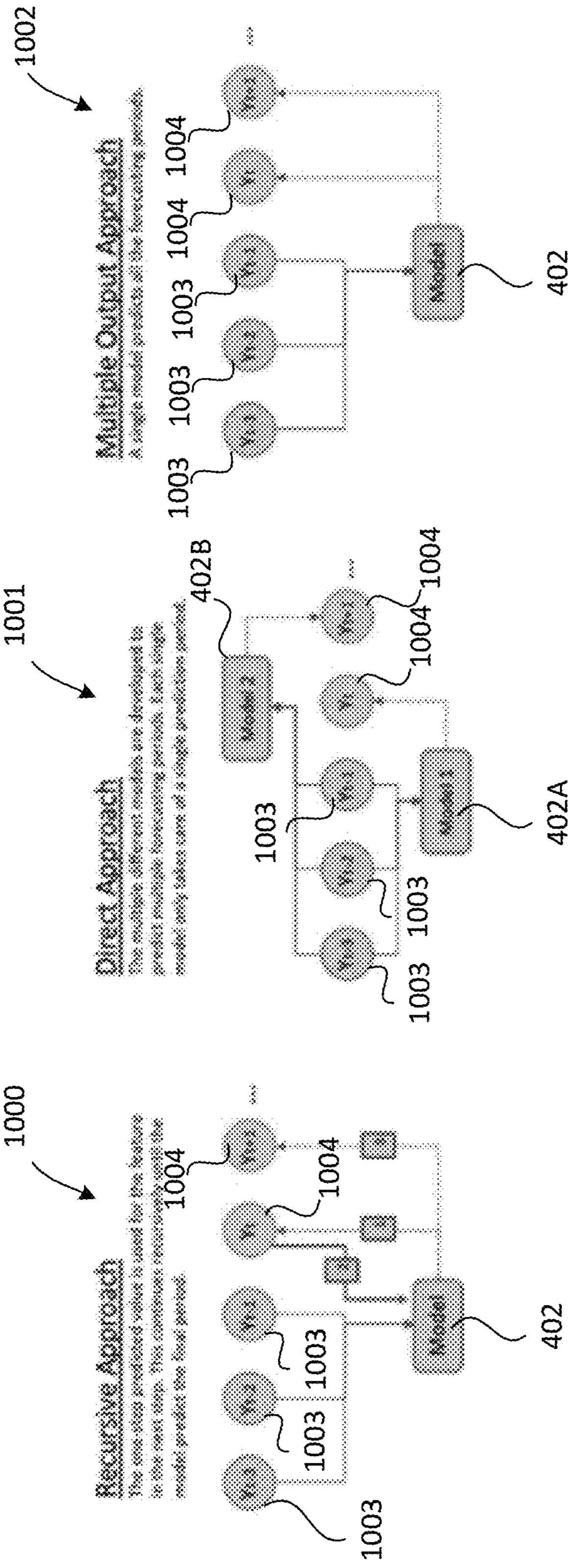
FIG. 10 is a set of flow diagrams depicting different approaches for a multi-step forecasting problem, according to various embodiments.

Referring now to FIG. 10, there is shown a set of flow diagrams depicting different approaches for a multi-step forecasting problem, according to various embodiments. In each flow diagram, inputs 1003 provide data for training model 402, and outputs (targets) 1004 represent forecasts of future events that may be generated by model 402.

In at least one embodiment, a recursive approach may be used for generating model 402, as shown in flow diagram 1000. For each step, a one-step predicted value may be used as an input feature in prediction of the next step. This may be repeated recursively until model 402 predicts the final step. Thus, for example, data generated for one time period may be used as input for the next time period. In such an approach, the same single model 402 may be used to generate forecasts for all future periods.

In another embodiment, a direct approach may be used, as shown in flow diagram 1001, wherein multiple different models 402A, 402B may be developed for generating forecasts for different periods. Each model 402A, 402B may be responsible for a single period. The same features may be shared across all models 402A, 402B, but the model targets may be different. By performing separate modeling for each period, such an approach may address some drawbacks of the recursive approach, for example by avoiding undesirable propagation of prediction error from one period to another. In at least one embodiment, the direct approach may be implemented in connection with a gradient boosting tree.

In yet another embodiment, a multiple output approach may be used, as shown in flow diagram 1002. In such an approach, model 402 may capture stochastic dependency across target values 1004, such as correlation among targets in different steps, thus providing advantages over the direct approach.

Method

Figure 5:
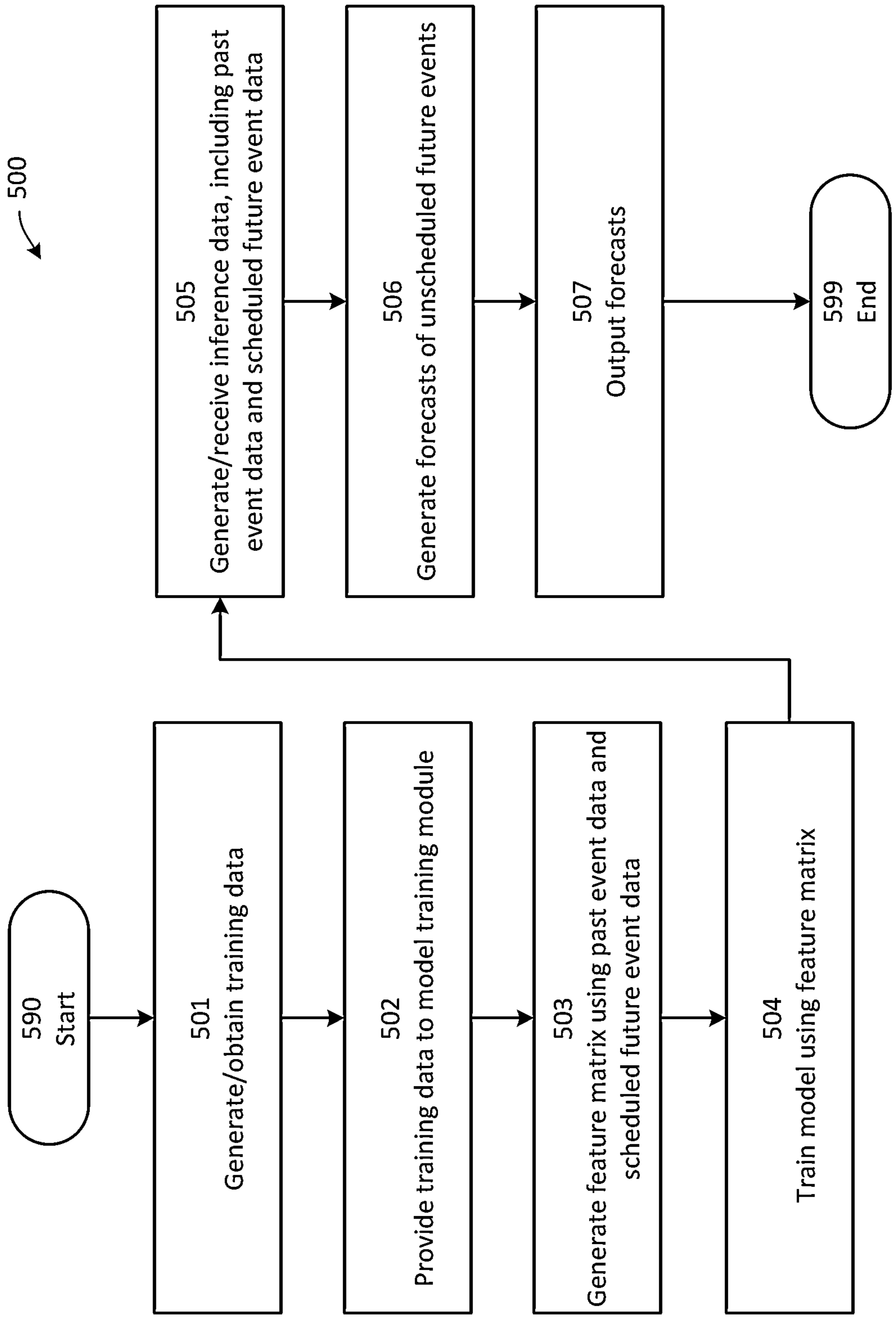
FIG. 5 is a flow diagram depicting a method for training and using a predictive model, according to one embodiment.

Referring now to FIG. 5, there is shown a flow diagram depicting a method 500 for training and using a predictive model, according to one embodiment. As described herein, method 500 may take into account past event data as well as scheduled future event data in training the model and/or as input to the trained model. Method 500 may be implemented in software running on any suitable hardware architecture, such as those depicted in FIGS. 1 and/or 2, and may be implemented using a software architecture and model structure as depicted in FIGS. 3 and/or 4. Alternatively, method 500 may be implemented in any other suitable device or system and/or using any other suitable hardware and/or software architecture.

Method 500 begins 590. Training data may be generated or obtained 501. In at least one embodiment, the training data may include data describing past events and/or scheduled future events. In this context and elsewhere herein, "scheduled future events" may include any future event(s) for which there is a high degree of confidence that the event(s) will occur. The training data may be generated by a component such as module 302 shown in FIG. 3.

The training data may be provided 502 to a model training module such as module 305 shown in FIG. 3. Using the past event data and scheduled future event data in the training data, model training module 305 may generate a feature matrix, such as feature matrix 401 shown in FIG. 4. Feature matrix 401 may then be used to train 504 a predictive model, such as time series forecasting model 402, using model training techniques that are known in the art.

Once model 402 has been trained, it can be used to generate forecasts of unscheduled future events. Inference data 303 may be generated and/or obtained 505; such data may include past event data and scheduled future event data, and may take the form of feature matrix 401. Model 402 may then use inference data 303 to generate 506 forecasts of unscheduled future events. The generated forecasts may then be output 507, for example via a user interface 307 presented on display screen 103 of device 101 or client device 108. Method 500 then ends 599.

In at least one embodiment, each iteration of training and validation of time series forecasting model may be performed using a particular target point in time, referred to as t0. Conventionally, only data prior to t0 is used to train a model, and the performance of the model can be tested on subsequent known points in time (referred to as t1, t2, and the like). According to the techniques described herein, the system and method may integrate scheduled future events (i.e., events scheduled prior to t0 that occur subsequent to t0) into model training, without invalidating the testing process (that is, without letting the model "cheat" and simply return values from after t0).

In at least one embodiment, the system and method may define a two-dimensional time series, with one axis indicating the event occurrence time and another axis indicating the time at which each event is scheduled. The target and features of the model may be designed so that the model can be trained using a feature matrix based on this two-dimensional dataset.

Time Series Example

Figure 6:
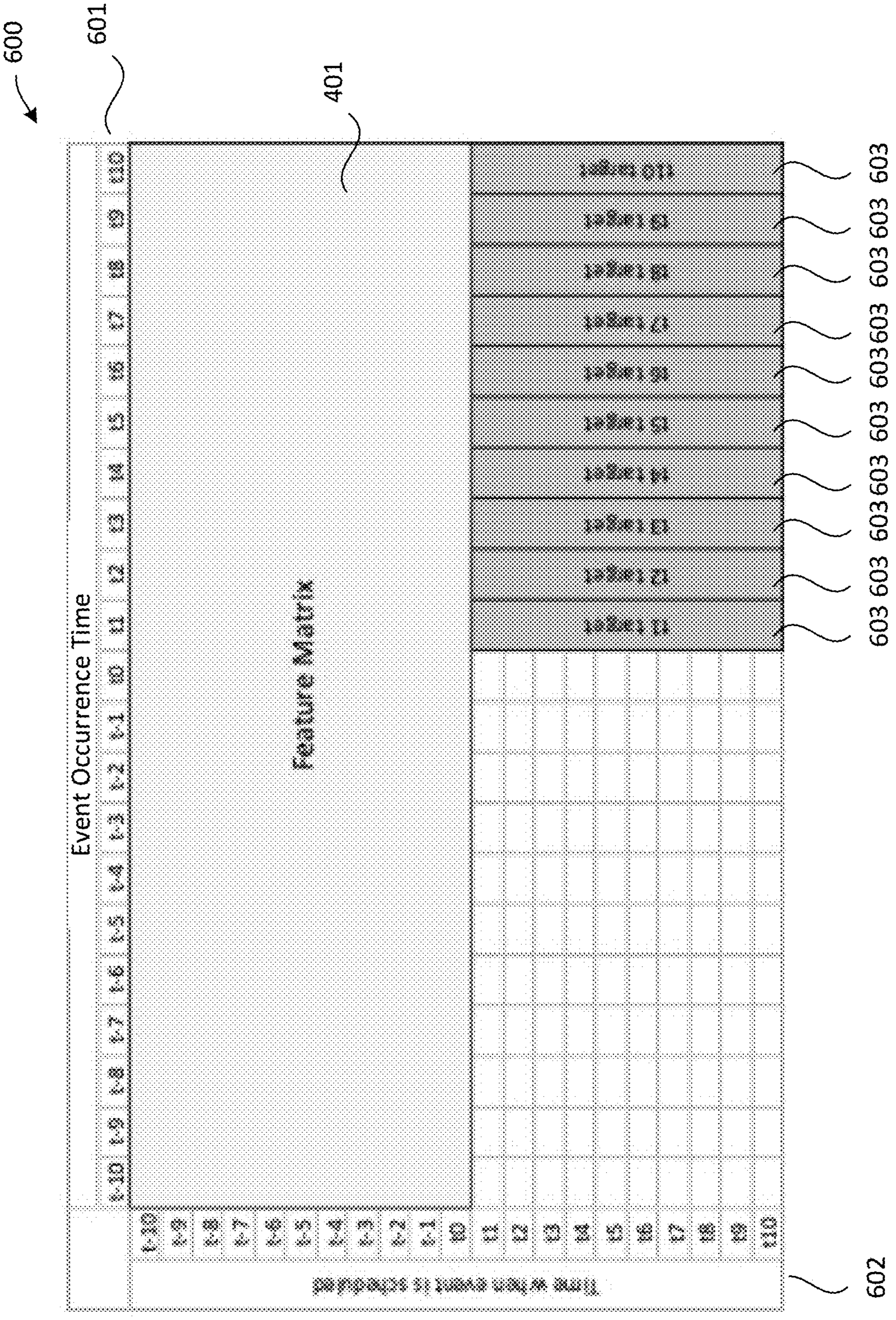
FIG. 6 is a graph depicting an example of a two-dimensional time series, which can be used as the basis of a feature matrix for training a predictive model according to one embodiment.

Referring now to FIG. 6, there is shown an example of a two-dimensional time series 600, which can be used as the basis of a feature matrix 401 for training time series forecasting model 402. X-axis 601 indicates event occurrence time (indicated in the example as times t−10 through t10) and y-axis 602 shows the time at which each event is/was scheduled. In the example, ten target events 603 are depicted, each corresponding to a different time t1 through t10. Feature matrix 401 is input to be used in training model 402, while target events 603 are those which model 402 is seeking to forecast.

For illustrative purposes, it can be assumed that t0 represents the current time, and that it is desired to predict unscheduled future events (target events 603) that have an event occurrence time from t1 to t10. In this example, data available for the forecast may include data extending back to t−10. Target events 603 represent events that are to take place in the future, specifically from t1 to t10, but have not been scheduled as of t0. Thus, for example:

t1 target event(s) represents one or more event(s) that will happen at t1 but have not been scheduled as of t0;

t2 target event(s) represents one or more event(s) that will happen at t2 but have not been scheduled as of t0;

etc.

In at least one embodiment, model 402 may predict target events 603 (including future target events and/or historical target events) based on a combination of past events and scheduled future events, which have been used to train model 402 via feature matrix 401. In at least one embodiment, feature matrix 401 may represent all available event data scheduled before the start of the forecasting period t0. Feature matrix 401 may be used as an input for model 402. It may include scheduled future events with event occurrence times from t1 to t10 that were scheduled before t1, in addition to past events with event occurrence times from t−10 to t0. In addition, matrix 401 may also contain information about when each event is scheduled (represented by y-axis 602 in FIG. 6). Such additional information may help model 402 to achieve better accuracy over conventional time-series models.

Predicted target events 603 may be added to previously scheduled events for the period (t1, t2, etc.), and the aggregated values may then be used to generate a forecast, as follows:

$$t1\text{ forecast}=t1\text{ prediction}+\text{events that happen at }t1\text{ and are scheduled before }t1$$

$$t2\text{ forecast}=t2\text{ prediction}+\text{events that happen at }t2\text{ and are scheduled before }t1$$

. . . .

Figure 9:
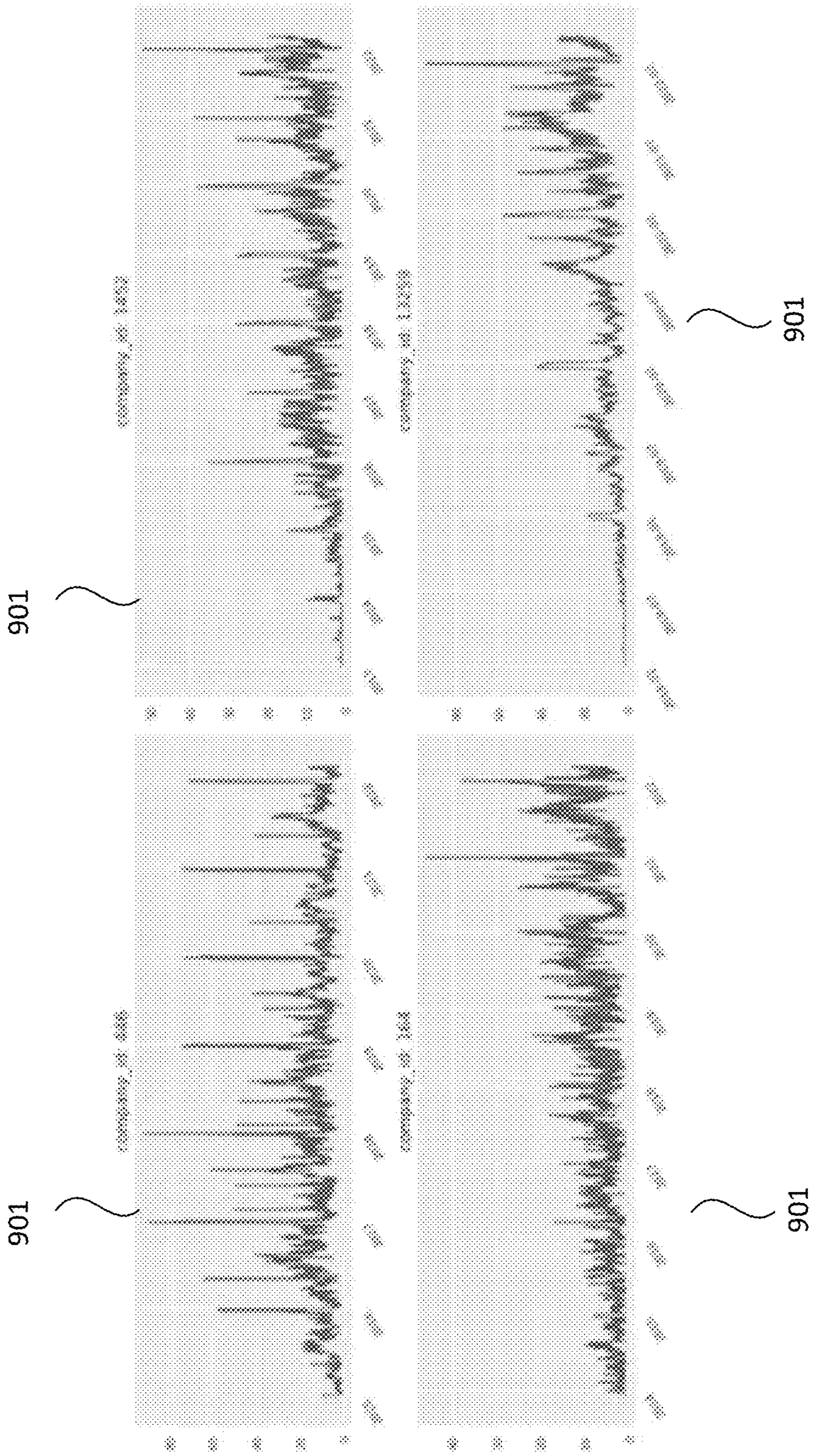
FIG. 9 is a set of graphs depicting examples of time series for leaves of absences for various entities, according to one embodiment.

Referring now to FIG. 9, there is shown a set of graphs 901 depicting examples of time series for leaves of absences for various entities, according to one embodiment. In at least one embodiment, the system may generate one model for each entity (such as a company). Alternatively, the system may use a global model for all entities (companies), which may be trained on a data set that includes all entities but may still learn individual time series patterns for each entity. By using such an approach, the system may cross-learn shared patterns across entities, which may result in improved forecasting performance.

Figure 7:
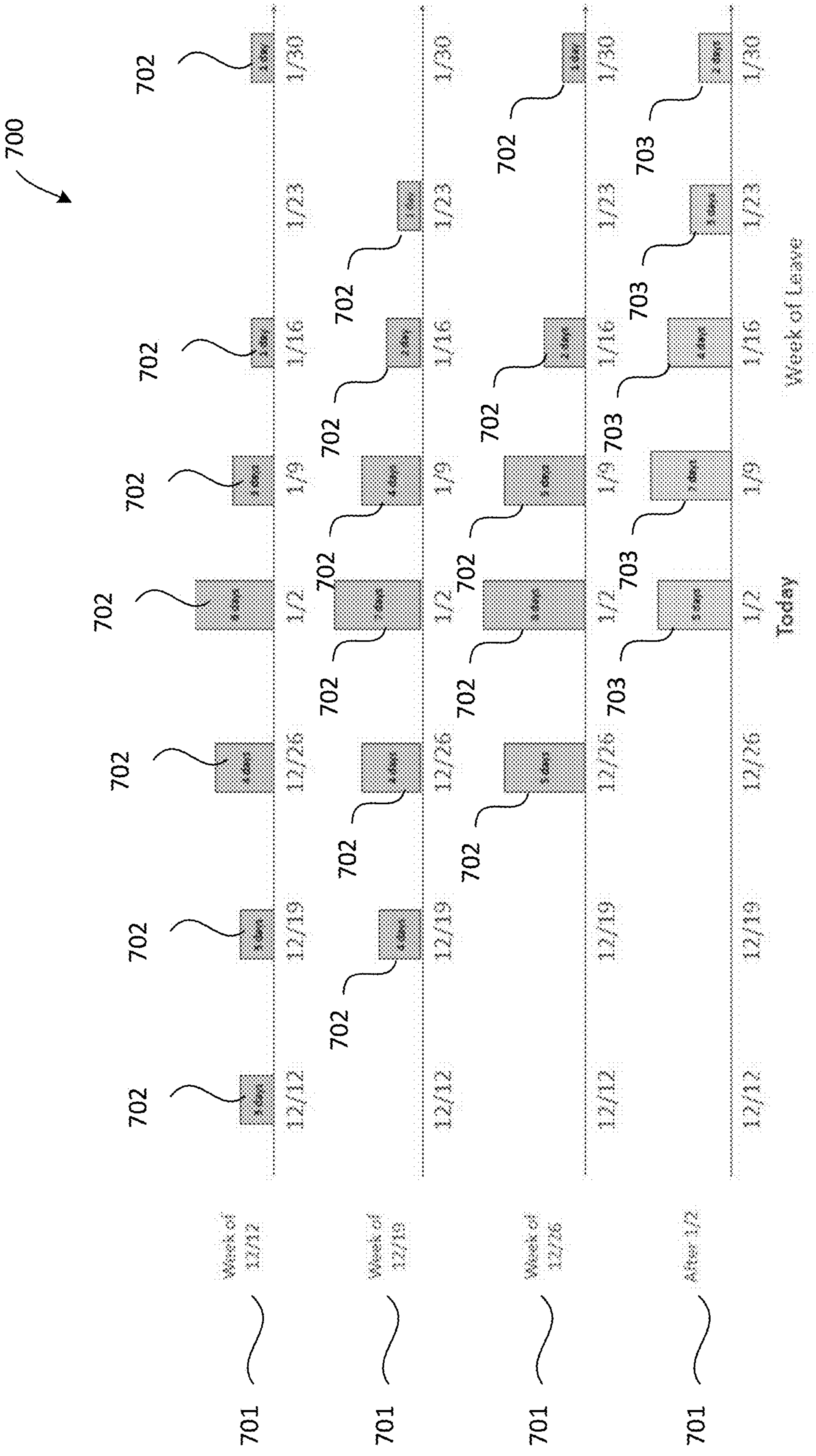
FIG. 7 is a graph series depicting an example of an application of the techniques described herein to generate forecasts for unscheduled leaves of absence based on previously scheduled leaves of absence, according to one embodiment.

Referring now to FIG. 7, there is shown a graph series 700 depicting an example of an application of the techniques described herein to generate forecasts for unscheduled leaves of absence based on previously scheduled leaves of absence, according to one embodiment. In this example, the current date is 1/2. A separate graph 701 is shown for each week from 12/12 through 1/2, including scheduled future (and past) leaves of absence 702 and forecast (unscheduled) future leaves of absence 703. Each scheduled future (and past) leave of absence 702 and forecast (unscheduled) future leave of absence 703 is associated with a start date and a duration.

Using the techniques described herein, unscheduled future leaves of absence 703 may be forecast (predicted) based on patterns of previous leaves of absence as well as patterns of already-scheduled future leaves of absence. Thus, in the depicted example, five unscheduled future leaves of absence 703 may be forecast (predicted), including:

a five-day leave of absence 703 starting on 1/2;

a seven-day leave of absence 703 starting on 1/9;

a four-day leave of absence 703 starting on 1/16;

a three-day leave of absence 703 starting on 1/23; and a two-day leave of absence 703 starting on 1/30.

User Interface

Figure 8:
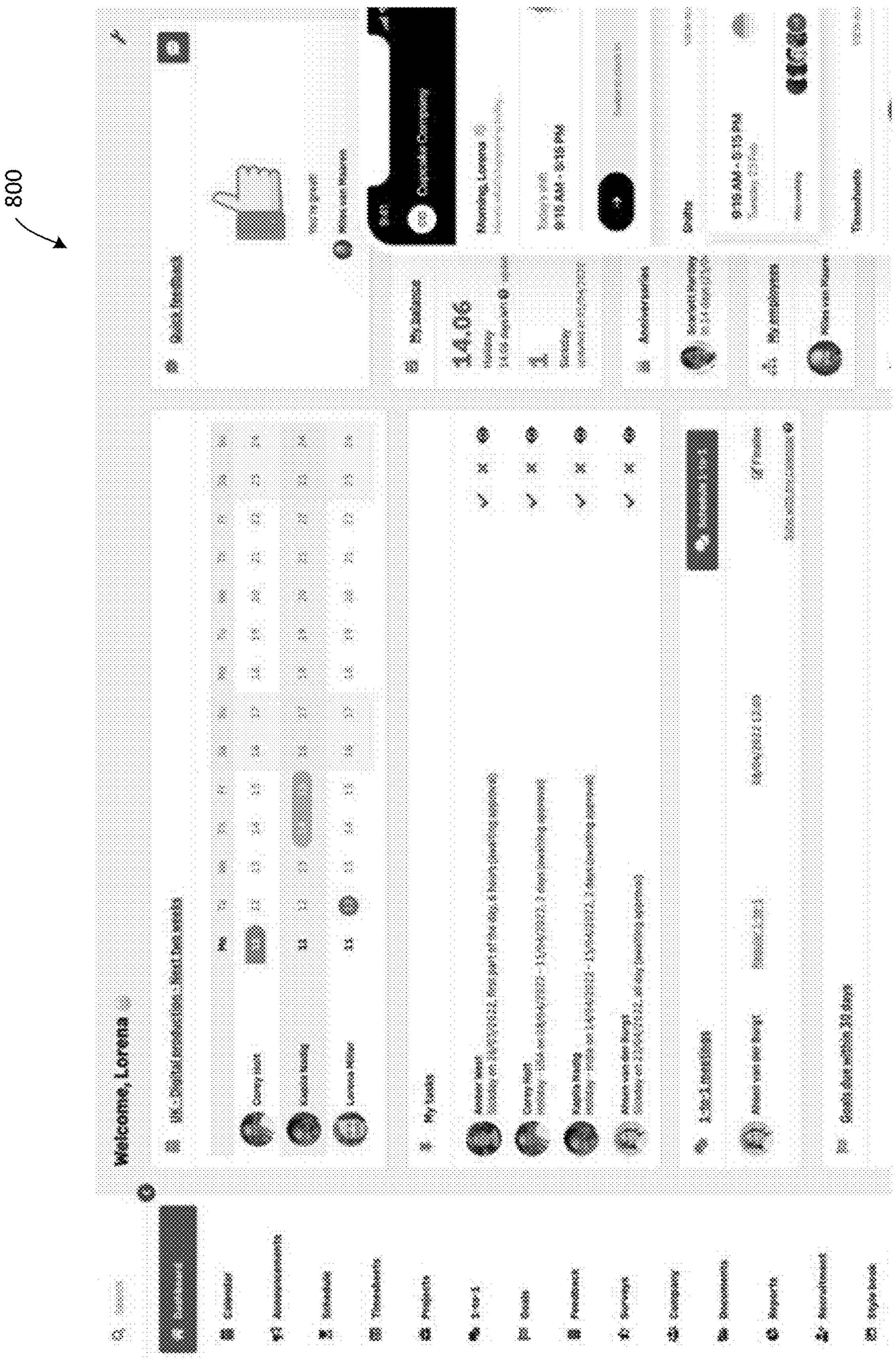
FIG. 8 is a screen shot depicting an example of a user interface for viewing and scheduling leaves of absences for individuals, including forecasts, according to one embodiment.

As described above, forecasts (predictions) may be output via any suitable user interface 307, which may be presented on display screen(s) 103 or via any other output device. Referring now to FIG. 8, there is shown an example 800 of a user interface 307 that may be used for viewing and scheduling leaves of absences for individuals, including forecasts, according to one embodiment. Example 800 may be provided, for example, as the dashboard page of a software application for human resources management, including schedules, tasks, meeting dates, absence balances, and/or the like for various employees.

Figure 12:
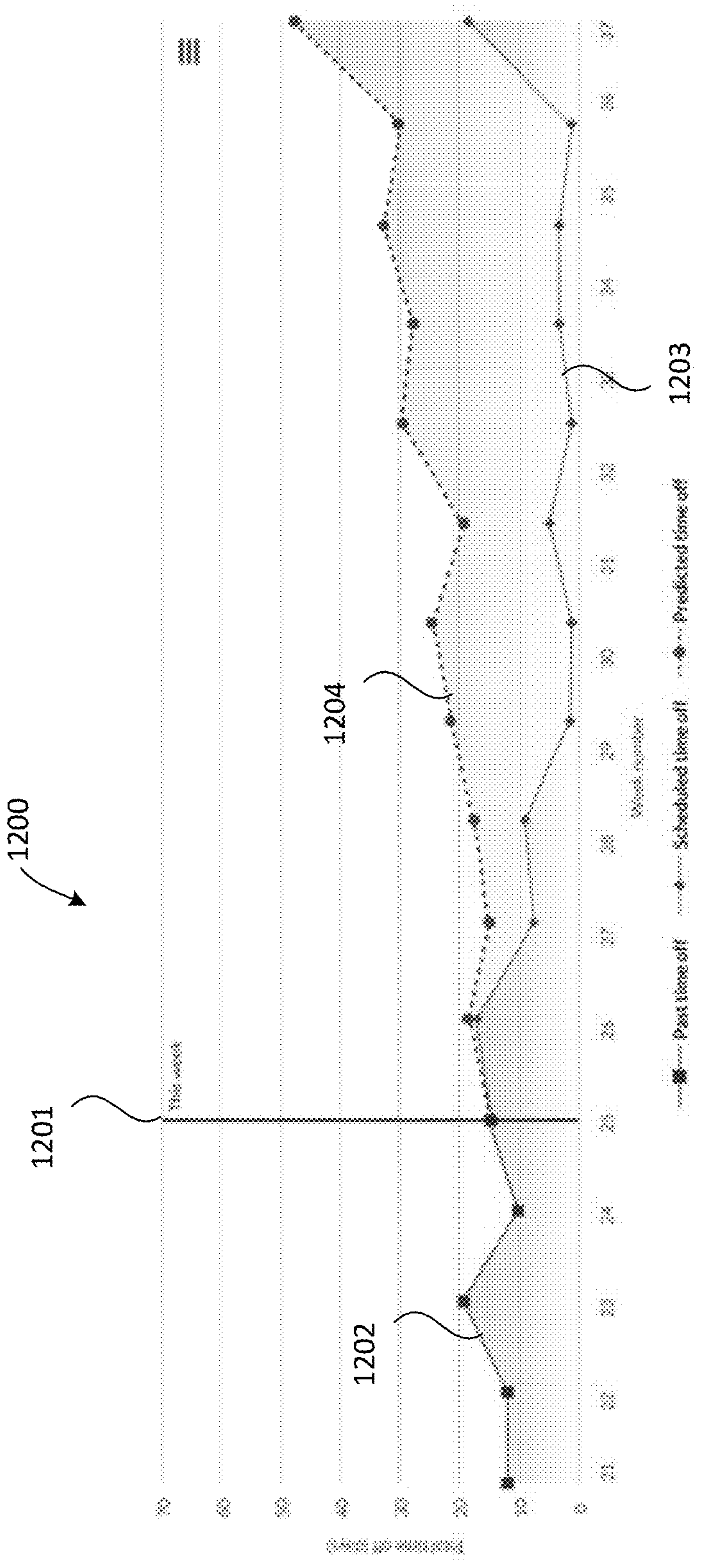
FIG. 12 is a screen shot depicting an example of a user interface for presenting predicted leaves of absences in an aggregated manner, according to one embodiment.

Referring now to FIG. 12, there is shown an example 1200 of a user interface for presenting predicted leaves of absences in an aggregated manner, according to another embodiment. As shown, the user interface may present aggregate numbers of leaves of absence in a line graph, although other types of visual representation may be used. The user interface shown in example 1200 includes the following elements:

present time 1201;

aggregate number of past leaves of absence 1202 at various points in time;

aggregate number of scheduled leaves of absence 1203 at various points in time; and aggregate number of forecast (predicted) leaves of absence 1204 at various points in time.

The techniques described herein may provide advantages over conventional time-series models that may take into account historical trends but may fail to use scheduled future events in generating forecasts. In various embodiments, the techniques described herein may take into account event booking patterns including events that are scheduled at a time different than the event occurrence time itself. By integrating scheduled (or high-confidence) future events into training of a time series forecasting model, and also taking event booking patterns into consideration, the system and method described herein may provide improved accuracy in forecasting events.

Although the techniques are described in terms of predicting leaves of absence, for example, one skilled in the art will recognize that the techniques may be applied in other contexts. As one example, the described techniques may be applied to cash flow forecasting as well as many other types of forecasting.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above may be presented in terms of algorithms and symbolic representations of operations on data bits within a memory of a computing device. These algorithmic descriptions and representations may be the means used by those skilled in the data processing arts to convey the substance of their work most effectively to others skilled in the art. An algorithm is here, and generally, conceived to be a self-consistent sequence of steps (instructions) leading to a desired result. The steps may be those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions may be embodied in software, firmware and/or hardware, and when embodied in software, may be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device may include, for example, a processor, an input device (such as a keyboard, mouse, touchpad, microphone, and/or any combination thereof), an output device (such as a screen, speaker, and/or the like), memory, long-term storage (such as magnetic storage, solid state storage, and/or the like), and/or network connectivity, according to techniques that may be well known in the art. Such an electronic device may be portable or non-portable. Examples of electronic devices that may be used for implementing the described system and method include: a smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for generating forecasts of unscheduled future events, comprising:

at a processor, obtaining training data for a predictive model, wherein the training data comprises:

at least one past event having an event occurrence time prior to the present time; and and at least one high-confidence future event, each comprising a previously scheduled event having an event occurrence time subsequent to the present time;

at the processor, generating a two-dimensional feature matrix from the training data, wherein:

a first dimension of the feature matrix represents event occurrence time; and a second dimension of the feature matrix represents time at which each event is scheduled;

at the processor, training the predictive model using the generated feature matrix;

at the processor, applying the trained model to generate forecasts of unscheduled future events; and at an output device, outputting the forecasts of unscheduled future events.

2. The method of claim 1, wherein training the predictive model comprises training the predictive model using a combination of at least one past event and at least one high-confidence future event.

3. The method of claim 1, wherein the predictive model comprises a machine learning model.

4. The method of claim 1, wherein applying the trained model to generate forecasts of unscheduled future events comprises:

receiving inference data; and applying the trained model to the inference data.

5. The method of claim 1, wherein:

each past event comprises an employee leave of absence having an event occurrence time prior to the present time; and each high-confidence future event comprises a previously scheduled employee leave of absence having an event occurrence time subsequent to the present time.

6. The method of claim 1, wherein the predictive model comprises a time series forecasting model.

7. The method of claim 6, wherein the time series forecasting model comprises a multi-label deep learning regression model having a Long Short-Term Memory (LSTM) layer and a fully connected layer.

8. A non-transitory computer-readable medium for generating forecasts of unscheduled future events, comprising instructions stored thereon, that when performed by a hardware processor, perform the steps of:

obtaining training data for a predictive model, wherein the training data comprises:

at least one past event having an event occurrence time prior to the present time; and and at least one high-confidence future event, each comprising a previously scheduled event having an event occurrence time subsequent to the present time;

generating a two-dimensional feature matrix from the training data, wherein:

a first dimension of the feature matrix represents event occurrence time; and a second dimension of the feature matrix represents time at which each event is scheduled;

training the predictive model using the generated feature matrix;

applying the trained model to generate forecasts of unscheduled future events; and causing an output device to output the forecasts of unscheduled future events.

9. The non-transitory computer-readable medium of claim 8, wherein training the predictive model comprises training the predictive model using a combination of at least one past event and at least one high-confidence future event.

10. The non-transitory computer-readable medium of claim 8, wherein the predictive model comprises a machine learning model.

11. The non-transitory computer-readable medium of claim 8, wherein applying the trained model to generate forecasts of unscheduled future events comprises:

receiving inference data; and applying the trained model to the inference data.

12. The non-transitory computer-readable medium of claim 8, wherein:

each past event comprises an employee leave of absence having an event occurrence time prior to the present time; and each high-confidence future event comprises a previously scheduled employee leave of absence having an event occurrence time subsequent to the present time.

13. The non-transitory computer-readable medium of claim 8, wherein the predictive model comprises a time series forecasting model.

14. The non-transitory computer-readable medium of claim 13, wherein the time series forecasting model comprises a multi-label deep learning regression model having a Long Short-Term Memory (LSTM) layer and a fully connected layer.

15. A system for generating forecasts of unscheduled future events, comprising:

a hardware processor, configured to:

obtain training data for a predictive model, wherein the training data comprises:

at least one past event having an event occurrence time prior to the present time; and and at least one high-confidence future event, each comprising a previously scheduled event having an event occurrence time subsequent to the present time;

generate a two-dimensional feature matrix from the training data, wherein:

a first dimension of the feature matrix represents event occurrence time; and a second dimension of the feature matrix represents time at which each event is scheduled;

train the predictive model using the generated feature matrix; and apply the trained model to generate forecasts of unscheduled future events; and an output device, communicatively coupled to the hardware processor, configured to output the forecasts of unscheduled future events.

16. The system of claim 15, wherein training the predictive model comprises training the predictive model using a combination of at least one past event and at least one high-confidence future event.

17. The system of claim 15, wherein the predictive model comprises a machine learning model.

18. The system of claim 15, wherein applying the trained model to generate forecasts of unscheduled future events comprises:

receiving inference data; and applying the trained model to the inference data.

19. The system of claim 15, wherein:

each past event comprises an employee leave of absence having an event occurrence time prior to the present time; and each high-confidence future event comprises a previously scheduled employee leave of absence having an event occurrence time subsequent to the present time.

20. The system of claim 15, wherein the predictive model comprises a time series forecasting model.

21. The system of claim 20, wherein the time series forecasting model comprises a multi-label deep learning regression model having a Long Short-Term Memory (LSTM) layer and a fully connected layer.

* * * * *